US012253972B2

(12) United States Patent
Bradley et al.

(10) Patent No.: US 12,253,972 B2
(45) Date of Patent: Mar. 18, 2025

(54) TECHNIQUES FOR STORING AND ACCESSING DATA USING AN INFORMATION MODEL

(71) Applicant: AUTODESK, INC., San Francisco, CA (US)

(72) Inventors: Gordon Bradley, Vancouver (CA); Gregory Vazzana, Hooksett, NH (US)

(73) Assignee: AUTODESK, INC., San Francisco, CA (US)

( * ) Notice: Subject to any disclaimer, the term of this patent is extended or adjusted under 35 U.S.C. 154(b) by 0 days.

(21) Appl. No.: 18/361,679

(22) Filed: Jul. 28, 2023

(65) Prior Publication Data

US 2025/0036595 A1    Jan. 30, 2025

(51) Int. Cl.
*G06F 16/14* (2019.01)
(52) U.S. Cl.
CPC .......... *G06F 16/148* (2019.01); *G06F 16/156* (2019.01)
(58) Field of Classification Search
CPC .............................. G06F 16/148; G06F 16/156
See application file for complete search history.

(56) References Cited

U.S. PATENT DOCUMENTS

| 10,671,671 B2 * | 6/2020 | Meyer ................. G06F 16/9024 |
| 2006/0195476 A1 | 8/2006 | Nori et al. |
| 2018/0068001 A1 | 3/2018 | Panwar et al. |
| 2020/0242135 A1 | 7/2020 | Shah et al. |
| 2022/0058502 A1 | 2/2022 | Anicic et al. |
| 2023/0119881 A1 * | 4/2023 | Makhija ........... G06V 30/19147 705/28 |
| 2024/0045743 A1 * | 2/2024 | Sagar ...................... G06F 16/27 |

OTHER PUBLICATIONS

GraphQL, "A Query Language for Your API", The official GraphQL conference, by the GraphQL Foundation, Retrieved from https://graphql.org, Sep. 19-21, 2023, pp. 1-5.
"How Netflix Scales its API with GraphQL Federation (Part 1)", Netflix Technology Blog, Retrieved from https://netflixtechblog.com/how-netflix-scales-its-api-with-graphql-federation-part-1-ae3557c187e2, Nov. 9, 2020, pp. 1-23.
Wikipedia, "Entity Component System", Retrieved from https://en.wikipedia.org/wiki/Entity_component_system, on Aug. 4, 2023, pp. 1-3.
International Search Report for Application No. PCT/US2024/039653 dated Sep. 30, 2024.

* cited by examiner

*Primary Examiner* — Etienne P Leroux
*Assistant Examiner* — Cindy Nguyen
(74) *Attorney, Agent, or Firm* — Artegis Law Group, LLP (57) ABSTRACT

Techniques are disclosed for storing and accessing data in an information model. In some embodiments, data is stored in the information model using assets, components, and relationships, or using any other suitable transformation of the data. Each asset is a container for components. Each component stores data according to a schema that defines the organization of data in the component. Assets and components can be related to other assets and/or other components. A file can be imported into the information model by extracting data from the file, creating assets and components in the information model based on the extracted data, and wiring together the created assets and components. In addition or alternatively, an application can invoke an API to write data to the information model. An application can also invoke the API to query the information model, such as to read data from the information model.

20 Claims, 8 Drawing Sheets

TECHNIQUES FOR STORING AND ACCESSING DATA USING AN INFORMATION MODEL

BACKGROUND

Field of the Disclosure

Embodiments of the present disclosure relate generally to computer science, computer networks, and data storage and, more specifically, to techniques for storing and accessing data using an information model.

Description of the Related Art

Large amounts of data are increasingly being generated in many different industries. One common approach for storing, accessing, and transferring data is using files and/or file hierarchies. For example, in the construction industry, files are oftentimes used to store data for different parts of a building, such as the walls, doors, windows, etc. of the building. As another example, in the media industry, files are oftentimes used to store data for different characters and objects in a movie.

One drawback of storing data in files or file hierarchies is that different software applications can use different file formats to store data. When one application stores data in a file having a particular file format, the stored data may be inaccessible to another application that does not support that particular file format.

Another drawback of storing data in files or file hierarchies is that the stored data can be difficult to access and use. Returning to the construction example, assume that a number of files are used to store properties of different parts of a building, including the materials used in those parts. In order to compute the total amount of a particular material in the building, a user would have to find all related parts of a model of the building, open up files that store information about the related parts, look up the amount of the particular material in the opened files, and add up the amounts of the particular material from those files.

Yet another drawback of storing data in files or file hierarchies is the difficulty of querying and managing relationships between files. The relationships between files can be dependent on the formats of those files. Users who are unaware of such dependencies can have difficulty querying, reasoning about, managing, and modifying the relationships encoded in data stored in the files, which can in turn cause issues in collaborative workflows because versioned data that is stored in different files may become unsynchronized and, therefore, inconsistent or broken.

As the foregoing illustrates, what is needed in the art are more effective techniques for storing and accessing data within computer systems.

SUMMARY

One embodiment of the present disclosure sets forth a computer-implemented method for processing data using an information model. The method includes receiving a first file that includes data associated with one or more objects. The method further includes performing one or more operations to extract the data associated with the one or more objects based on one or more schemas. The method also includes for each object included in the one or more objects, adding to an information model an asset representing the object and one or more components associated with the asset, where each component included in the one or more components stores a portion of data associated with the object. In addition, the method includes executing a query against the information model to generate a result based on at least one of the one or more components, and transmitting the result to an application.

Another embodiment of the present disclosure sets forth a computer-implemented method for processing data using an information model. The method includes receiving data associated with one or more objects and one or more relationships between the one or more objects. The method further includes performing one or more operations to transform the data associated with the one or more objects into transformed data. The method also includes adding to an information model the transformed data and one or more indications of the one or more relationships between the one or more objects. In addition, the method includes executing a query against the information model to generate a result based on the transformed data, and transmitting the result to an application.

Other embodiments of the present disclosure include, without limitation, one or more computer-readable media including instructions for performing one or more aspects of the disclosed techniques as well as a computing device for performing one or more aspects of the disclosed techniques.

One technical advantage of the disclosed techniques relative to the prior art is that, with the disclosed techniques, data is stored in an information model implemented within a computer system, where the information model allows the data to be accessed across different software applications. Further, data stored in the information model can be queried and used more readily than data that is stored in individual files according to prior art techniques. In addition, the information model enables collaboration and managed workflows on the data stored in the information model by surfacing relationships and dependencies within the stored data in a standardized manner. These technical advantages represent one or more technological advancements over prior art approaches.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present disclosure. However, it will be apparent to one of skill in the art that the present disclosure may be practiced without one or more of these specific details.

System Overview

Figure 1:
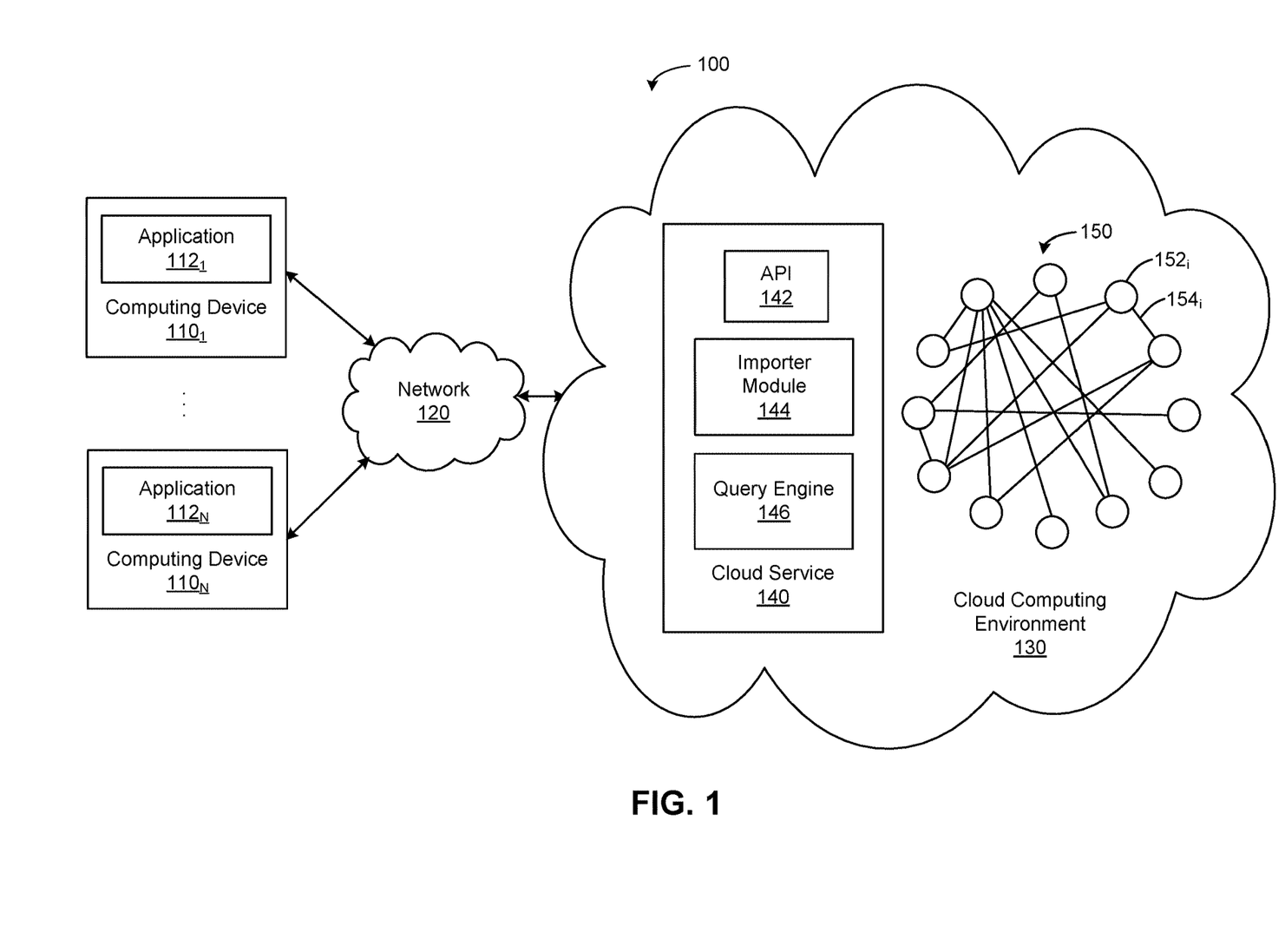
FIG. 1 is a conceptual illustration of a system configured to implement one or more aspects of the various embodiments.

FIG. 1 illustrates a system 100 configured to implement one or more aspects of the various embodiments. As shown, the system 100 includes a number of computing devices 1101 to 110N (referred to herein collectively as computing devices 110 and individually as a computing device 110) that are in communication with a cloud computing environment 130 over a network 120, which may be a wide area network (WAN) such as the Internet, a local area network (LAN), or any other suitable network.

In some embodiments, the cloud computing system 130 includes a network of interconnected computing nodes (not shown) that receive, transmit, process, and/or store data. The interconnected computing nodes can include any suitable combination of software, firmware, and hardware. Further, the computing nodes can be co-located or physically distributed from one another. For example, the computing nodes could include one or more general-purpose personal computers (PCs), Macintoshes, workstations, Linux-based computers, server computers, one or more server pools, or any other suitable devices. An exemplar computing node that can be used in the cloud computing system 130 is described in conjunction with FIG. 2.

As shown, the cloud computing system 130 includes a cloud service 140 and an information model 150. The cloud service 130 can be one or more applications running in the cloud computing system 130 that provide any technically feasible compute, storage, and/or other processing services in some embodiments. Returning to the construction example, the cloud service 130 could provide a document management service and a common data environment, and/or or any other service or services related to the construction industry. In some embodiments, the cloud service 140 runs on one or more computing nodes of the cloud computing system 130, described above, and the information model 150 can be stored in the computing nodes or elsewhere (e.g., a network-attached storage device (NAS) or a storage area network (SAN)). Illustratively, the cloud service 140 includes an importer module 144 and a query engine 146, and the cloud service 140 exposes an application programming interface (API) 142, which are described in greater detail below.

In some embodiments, data is stored in the information model 150 using assets, components, and relationships. Each asset is a container for components, and each asset can represent any atomically trackable, versionable piece of information. Components are used to group and represent data. Each component stores data according to a schema that defines the organization of data in the component. In particular, each component stores a portion of the data associated with the asset, and the components can be queried to inspect such data for the asset. Assets and/or components can be related to other assets and/or other components. Examples of assets, components, and relationships are described in conjunction with FIGS. 3-5.

In some embodiments, the information model 150 can be implemented using a graph database. In some embodiments, the information model 150 can be implemented using a federation of databases. In some other embodiments, an information model can be implemented using any technically feasible back-end storage mechanism, including storage solutions that implement an information model in a federated manner. Illustratively, the information model 150 is implemented as a graph database that includes a number of nodes 152*i* (referred to herein collectively as nodes 152 and individually as a node 152) and links 154*i* between the nodes 152*i* (referred to herein collectively as links 154 and individually as a link 154). Each of the nodes 152 can store data associated with an asset, a component, or another container (e.g., a container for an asset). Each of the links 154 can represent a relationship between nodes 152. Returning to the construction example, a door could be represented by a door asset and components (e.g., a classification component that indicates a type of the asset, a property component that indicates properties of the asset, etc.) that stored data related to the door. In such a case, the door asset and the components can each be stored as a node in the graph database. Further, relationships between the door asset and the components, as well as between the door asset and the components thereof and other assets and/or components, can be stored as links between nodes in the graph database. Example relationships are described in conjunction with FIGS. 4-5.

As shown, an application 1121 to 112N (referred to herein collectively as applications 112 and individually as an application 112) runs in each of the computing devices 1101 to 110N, respectively. Any suitable applications, such as construction design applications, media applications, etc., can access the cloud computing environment 130 in some embodiments.

The cloud service 140 permits applications (e.g., applications 112) to read and write to the information model 150, as well as query the information model 150. In some embodiments, the cloud service 140 uses files to read and write data to the information model 150. In some embodiments, the cloud service 140 exposes the API 142 that applications can invoke to access the information model 150, including reading, writing, and/or querying the information model 150.

In some embodiments, applications can read and/or write data to the information model 150 using file-based interface (s). In such cases, when an application (e.g., a file-based application) uploads a file that includes data, data in the file can be imported into the information model 150 or replaced entirely with information model 150 data representing contents of the file. In addition, when an application (e.g., a file-based client application) reads data from the information model 150, parameters stored in the information model 150 can be used to dynamically generate files, where needed, for the application.

More specifically, in some embodiments, when an application uploads a file, the importer module 144 imports data from the file by extracting data from the file, creating assets and components in the information model 150 based on the extracted data, and wiring together the created assets and components. As described, in some embodiments, schemas are used to define the organization of data in the assets and components. In some embodiments, assets can also store instructions on how to edit data attached to the asset, such as components thereof. To import data from a file, the importer module 144 opens the file, identifies objects within the file that can be represented using assets and components, and extracts data from the file that is needed to create the assets and the components according to associated schemas. In some embodiments, the file can include data for assets and components because the application that created the file is aware of the schemas and created the file to include data for assets and components according to the schemas. However, the assets and components are not required to be defined in the file. Instead, the importer module 144 can translate the data in the file into appropriate assets and components. That is, after extracting the data from the file, the importer module 144 uses the extracted data to create assets and components in the information model 150, as well as relationships between the assets and components and other assets and/or components. Although described herein primarily with respect to creating assets and components using data from a file, in some embodiments, data from a file can be transformed in any technically feasible manner and persisted in the information model 150. For example, data from a file could be kept as a blob, and data could be reflected/surfaced out of the blob into the information model 150; data could be pulled from a file and translated into assets and components that are stored in the information model 150; or something in between.

It should be understood that once data from a file is imported into the information model 150, the data is usable via the information model 150, without need for the file or the application that created and/or uploaded the file. Further, the information model 150 permits data stored therein to be accessed at a granular level, rather than a file level, as discussed in greater detail below.

In addition or alternative to using files to read and write data to the information model 150, an application 112 can write data to the information model 150 by making an API call via API 142. An application 112 can also make an API call to query the information model 150, such as to read data from the information model 150.

The computing devices and cloud computing environment of FIG. 1 may be modified as desired in some embodiments. Further, the functionality included in any of the applications 112 and the cloud service 140 may be divided across any number of applications or other software that are stored and execute via any number of devices that are located in any number of physical locations.

Figure 2:
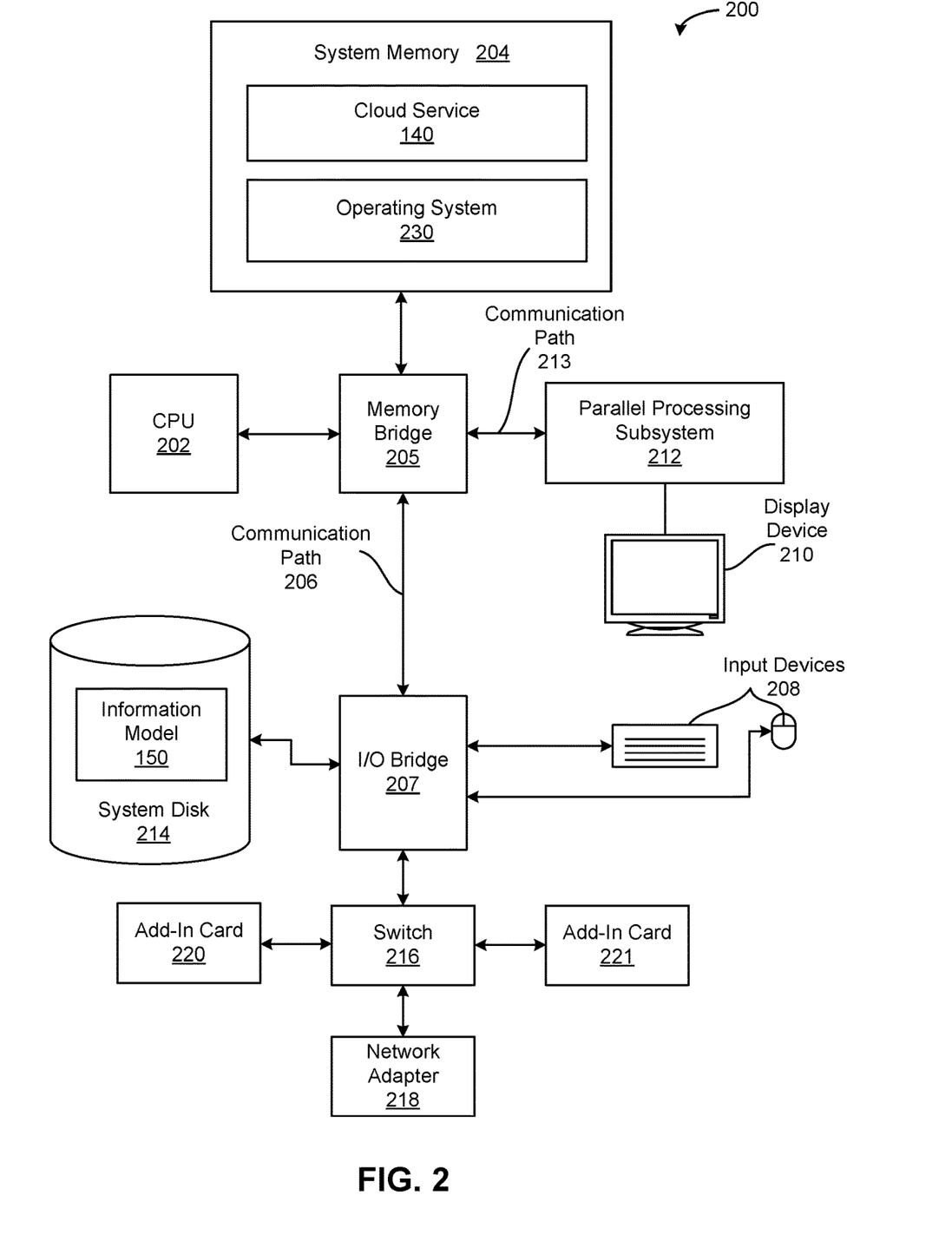
FIG. 2 illustrates an exemplar computing node within the cloud computing environment of FIG. 1, according to various embodiments.

FIG. 2 illustrates an exemplar computing node 200 within the cloud computing environment 130 of FIG. 1, according to various embodiments. In some embodiments, each of the computing devices 110, Described above in conjunction with FIG. 1, can include similar components as the computing node 200. As shown, the computing node 200 includes, without limitation, a central processing unit (CPU) 202 and a system memory 204 coupled to a parallel processing subsystem 212 via a memory bridge 205 and a communication path 213. The memory bridge 205 is further coupled to an I/O (input/output) bridge 207 via a communication path 206, and the I/O bridge 207 is, in turn, coupled to a switch 216.

In operation, the I/O bridge 207 is configured to receive user input information from one or more input devices 208, such as a keyboard, a mouse, a joystick, etc., and forward the input information to the CPU 202 for processing via the communication path 206 and the memory bridge 205. The switch 216 is configured to provide connections between the I/O bridge 207 and other components of the computing node 200, such as a network adapter 218 and various add-in cards 220 and 221. Although two add-in cards 220 and 221 are illustrated, in some embodiments, the computing node 200 may only include a single add-in card.

As also shown, the I/O bridge 207 is coupled to a system disk 214 that may be configured to store content, applications, and data for use by CPU 202 and parallel processing subsystem 212. As a general matter, the system disk 214 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high-definition DVD), or other magnetic, optical, or solid state storage devices. Finally, although not explicitly shown, other components, such as universal serial bus or other port connections, compact disc drives, digital versatile disc drives, movie recording devices, and the like, may be connected to the I/O bridge 207 as well.

In various embodiments, the memory bridge 205 may be a Northbridge chip, and the I/O bridge 207 may be a Southbridge chip. In addition, communication paths 206 and 213, as well as other communication paths within the computing node 200, may be implemented using any technically suitable protocols, including, without limitation, AGP (Accelerated Graphics Port), HyperTransport, or any other bus or point-to-point communication protocol known in the art.

In some embodiments, the parallel processing subsystem 212 comprises a graphics subsystem that delivers pixels to a display device 210 that may be any conventional cathode ray tube, liquid crystal display, light-emitting diode display, or the like. In such embodiments, the parallel processing subsystem 212 incorporates circuitry optimized for graphics and video processing, including, for example, video output circuitry. Such circuitry may be incorporated across one or more parallel processing units (PPUs) included within the parallel processing subsystem 212. In other embodiments, the parallel processing subsystem 212 incorporates circuitry optimized for general purpose and/or compute processing. Again, such circuitry may be incorporated across one or more PPUs included within the parallel processing subsystem 212 that are configured to perform such general purpose and/or compute operations. In yet other embodiments, the one or more PPUs included within the parallel processing subsystem 212 may be configured to perform graphics processing, general purpose processing, and compute processing operations. The system memory 204 may include at least one device driver configured to manage the processing operations of the one or more PPUs within the parallel processing subsystem 212.

In various embodiments, the parallel processing subsystem 212 may be or include a graphics processing unit (GPU). In some embodiments, the parallel processing subsystem 212 may be integrated with one or more of the other elements of FIG. 2 to form a single system. For example, the parallel processing subsystem 212 may be integrated with the CPU 202 and other connection circuitry on a single chip to form a system on chip (SoC).

It will be appreciated that the system shown herein is illustrative and that variations and modifications are possible. The connection topology, including the number and arrangement of bridges, the number of CPUs, and the number of parallel processing subsystems, may be modified as desired. For example, in some embodiments, the system memory 204 could be connected to the CPU 202 directly rather than through the memory bridge 205, and other devices would communicate with the system memory 204 via the memory bridge 205 and the CPU 202. In other alternative topologies, the parallel processing subsystem 212 may be connected to the I/O bridge 207 or directly to the CPU 202, rather than to the memory bridge 205. In still other embodiments, the I/O bridge 207 and the memory bridge 205 may be integrated into a single chip instead of existing as one or more discrete devices. In some embodiments, any combination of the CPU 202, the parallel processing subsystem 212, and the system memory 204 may be replaced with any type of virtual computing system, distributed computing system, or cloud computing environment, such as a public cloud, a private cloud, or a hybrid cloud. Lastly, in certain embodiments, one or more components shown in FIG. 2 may not be present. For example, the switch 216 could be eliminated, and the network adapter 218 and add-in cards 220, 221 would connect directly to the I/O bridge 207.

Illustratively, the system memory 204 stores an operating system 232 on which the cloud service 140 runs. The operating system 232 may be, e.g., Linux®, Microsoft Windows®, or macOS® in some embodiments. The cloud service 140 is described in greater detail herein in conjunction with FIGS. 1 and 3-8.

Storing and Accessing Data Using an Information Model

Figure 3:
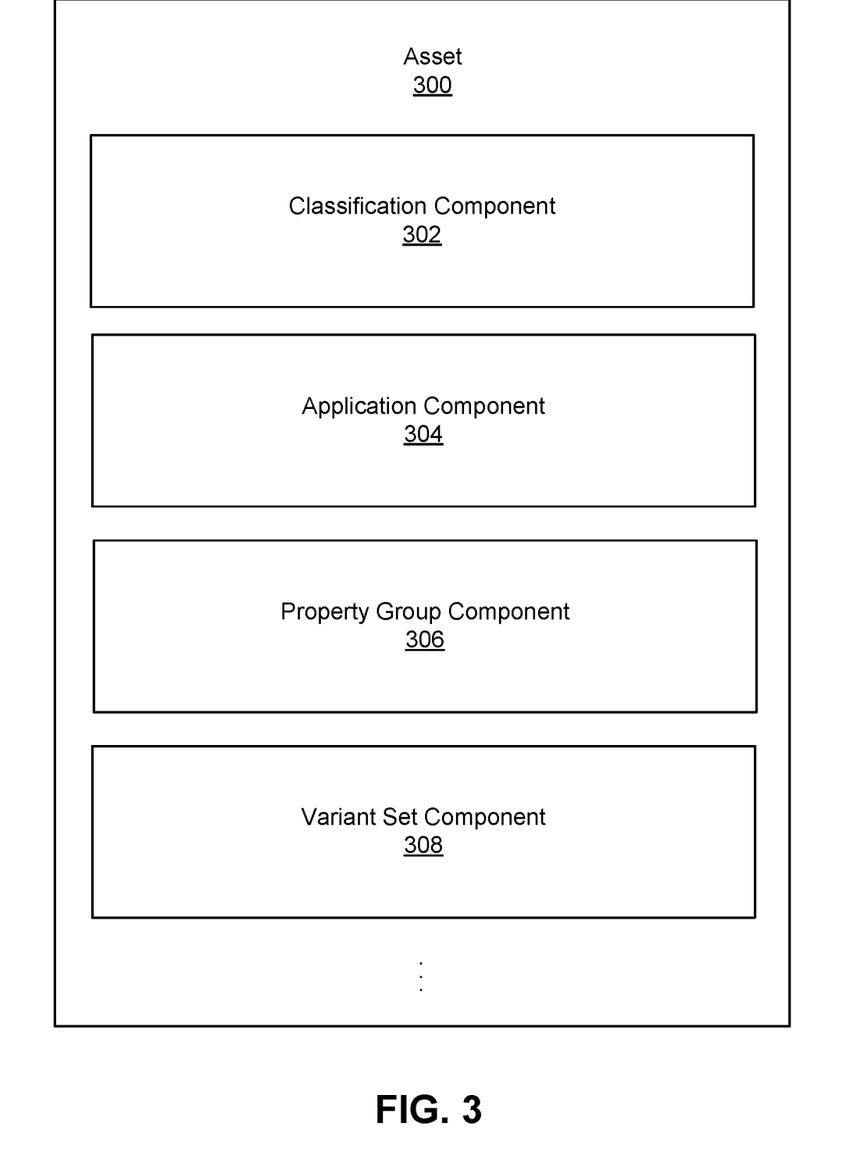
FIG. 3 illustrates an exemplar asset that can be stored in the information model of FIG. 1, according to various embodiments.

FIG. 3 illustrates an exemplar asset 300 that can be stored in the information model of FIG. 1, according to various embodiments. As shown, the asset 300 is a container for components, including a classification component 302, an application component 304, a property group component 306, and a variant set component 308. Although example components are shown for illustrative purposes, in some embodiments, an asset can be a container for any number of components of any suitable type. The asset 300 can be used to represent any atomically trackable, versionable piece of information. Returning to the construction example, an asset could be used to represent, e.g., a door, a wall, a 3D model, a version thereof, etc. The components 302, 304, 306, and 308 are used to group and represent data associated with the object represented by the asset 300.

In some embodiments, components (e.g., components 302, 304, 306, and 308) can store data as name-value pairs. In some embodiments, components can include well-defined data, such as parameters, and components can also include references to other assets, such as binary data (e.g., an image, video, audio, or other file) behind an asset (e.g., an image of a door for a door asset). In some embodiments, multiple instances of the same component (e.g., multiple instance of the property group component) are allowed to be attached to the same asset, but with different names. In some embodiments, components can also be attached to relationships that relate the components to other assets and/or components.

In some embodiments, the elements of an information model, such as assets and components, can adhere to different schemas that define the organization of data in such elements, i.e., data patterns for such elements. In the example of FIG. 3, each of the components 302, 304, 306, and 308 stores a portion of data associated with the object represented by the asset 300 according to a schema that defines the organization of data in the component 302, 304, 306, or 308. For example, a schema for the classification component 302 could define the types of data, described in greater detail below, that are required for the classification component. Similarly, there can be a property group component schema, an application component scheme, a variant set component schema, etc. As another example, a schema for a 3D point component could define that x, y, and z coordinate data is required for the 3D point component. Examples of schemas associated with assets include a binary asset schema, an image asset schema, etc. In some embodiments, a schema associated with an asset or component can also define data internal to the asset or component according to other schema(s). For example, a schema for a coordinate system component could include an X, Y, and Z property that all adhere to a 3D point component schema, described above.

In some embodiments, different elements (e.g., assets and components) of an information model and associated schemas can be predefined. For example, components that are relevant to a particular industry (e.g., construction, media, etc.) could be predefined. In addition or alternatively, in some embodiments, users can be permitted to define elements of an information model and associated schemas. In some embodiments, the predefined and/or user-defined elements can be included in a library of components that applications can use. For example, an application could create a file that includes a door represented by certain components from the library of components that store data associated with the door.

When an application 112 uploads a file to the cloud service 140, the importer module 144 can use the predefined and/or user-defined schemas that are associated with assets and components to extract data from the file, create assets and components in the information model 150 based on the extracted data, and wire together the created assets and components. As described, in some embodiments, the file can include data for assets and components because the application that created the file is aware of the (predefined and/or user-defined) schemas and created the file to include data for assets and components according to the schemas. Returning to the construction example in which an application created a file that includes a door, such a file could be imported by opening the file, identifying the door in the file, extracting data needed to create components for the door from the file according to associated schemas, and creating an asset representing the door as well as components that store the extracted data. As described, once data from a file is imported into the information model 150, the data is usable via the information model 150, without need for the file or the application that created and/or uploaded the file. In some other embodiments, data from a file can be transformed in any technically feasible manner (e.g., into blob(s)) and persisted in the information model 150, as described above in conjunction with FIG. 1.

In addition or alternative to uploading a file, an application 112 can write data to the information model 150 (e.g., write data to create assets and associated components that represent a door) by making an API call via API 142. In the construction example, an application 112 could make an API call to create assets and associated components that represent a door. As another example, an application 112 could make an API call to modify an existing asset associated with a door by, for example, adding a component to the asset. In such a case, the application 112 can first find the existing asset using a query that can also be made via an API call, and then make another API call to modify the existing asset. It should be understood that, by permitting an application to modify an asset stored in the information model 150, different facets of a design problem can be captured in a dynamic and extensible manner. Returning to the example of the asset associated with a door, one application could know the geometry of the door, while another application could know the materials using in the door, the manufacturing requirements, a client request, etc. A component can be added to the door asset for each such facet to store associated data, and each application can create, edit, edit, and present parts of the information model 150 that the application understands, without requiring a single monolithic schema for every facet of the asset that every application is required support. Further, because components are dynamic, the information model 150 can be updated to include new application data or design facets without having to modify all of the existing schemas. In addition, data modeling problems that would otherwise create inheritance or schema management problems, such as an asset that is both a door and a window or changing an element from a wall to a window, can be handled relatively easily by updating adding and/or updating components of assets in the information model 150.

An application 112 can also make other kinds of API calls to query the information model 150, such as to read data from the information model 150. In some embodiments, applications can query the information 150 model based on components stored in the information model 150 and/or information in the components. For example, an application 112 could query the information model 150 to retrieve information about all assets classified as doors in associated classification components. It should be understood that querying the information model 150 permits data stored therein to be accessed at a granular level, rather than a file level, which can be more computationally efficient than opening file(s) having large amounts of data that end up being unused.

The classification component 302 stores data indicating how the asset 300 is identified according to a standard. In some embodiments, a classification component can store data indicating the type of an object represented by an asset and identification information for the object according to one or more industry classification standards, open source industry standards, and/or de facto industry standards that to help move data and design intent between applications. Returning to the construction example in which the object is a door, the classification component 302 could store a "door" type and identification information for the door according to construction industry classification standards, open source standards, and/or de facto standards, examples of which include IFC (Industry Foundation Classes), MasterFormat, Uniclass, OmniClass, ISO (International Standards Organization) classification, USD (Universal Scene Description), and/or OTIO (Open Timeline IO).

The application component 304 stores data indicating an application associated with the asset 300 and related information. In some embodiments, the application component 304 can store data indicating a name of the application, a version of the application, plugins associated with the application, and/or a reference set associated with the application. The reference set is a set of other assets that the asset 300 depends on. In some embodiments, a reference relationship is a lightweight manner to persist a relationship between assets, and a reference relationship is not enforced by a graph database that stored the information model. By contrast, a uses relationship, described in greater detail below, is a more robust way to relate assets together, and uses relationships can be enforced by a graph database. More generally, any technically feasible relationships, including references, dependencies, instancing, and/or other data relationships, can be stored in some embodiments. Returning to the construction example, the application component 304 could store the name of an application that uploads a file used to create the asset 300, or that makes an API call to create the asset 300, as well as information related to such an application, including a reference set associated with the application.

The property group component 306 stores data indicating properties of the asset 300. In some embodiments, the property group component 306 stores one or more types of properties and values associated with the type(s) of properties. Returning to the construction example in which the asset 300 represents a door, the property group component 306 could store properties of the door, such as a size of the door, materials used to construct the door, a cost of the door, etc.

The variant set component 308 stores data indicating variants of the asset 300. Each variant is a different representation of the same object represented by the asset 300. In some embodiments, the variant set component 308 stores a name of the variant associated with the asset 300, as well as the names of other variants and references to those variants. Each of the other variants can be stored in the information model 150 or external to the information model 150. Returning to the construction example in which the asset 300 represents a door, assume the asset 300 is associated with a three-dimensional (3D) mesh of the door. In such a case, the variant set component 308 could store the name "mesh," as well as the names of other variants (e.g., images of the door) of the same door and references to those variants, such as references to the 3D mesh and other variants.

Although described with respect to the classification component 302, the application component 304, the property group component 306, and the variant set component 308 as reference examples of components, in some embodiments, any suitable components can be defined and used in conjunction with assets. Examples of other components that can be used in some embodiments include a 3D model component that stores a name and a reference to a 3D model; a binary reference component that stores a name, a type, and a reference to binary data (e.g., images, audio, video, etc.) behind an asset; a geometry collection component that stores geometry data; a bounding box component that stores a bounding box; an instance component that stores a position; a coordinate system component that stores coordinate system data; etc.

Figure 4:
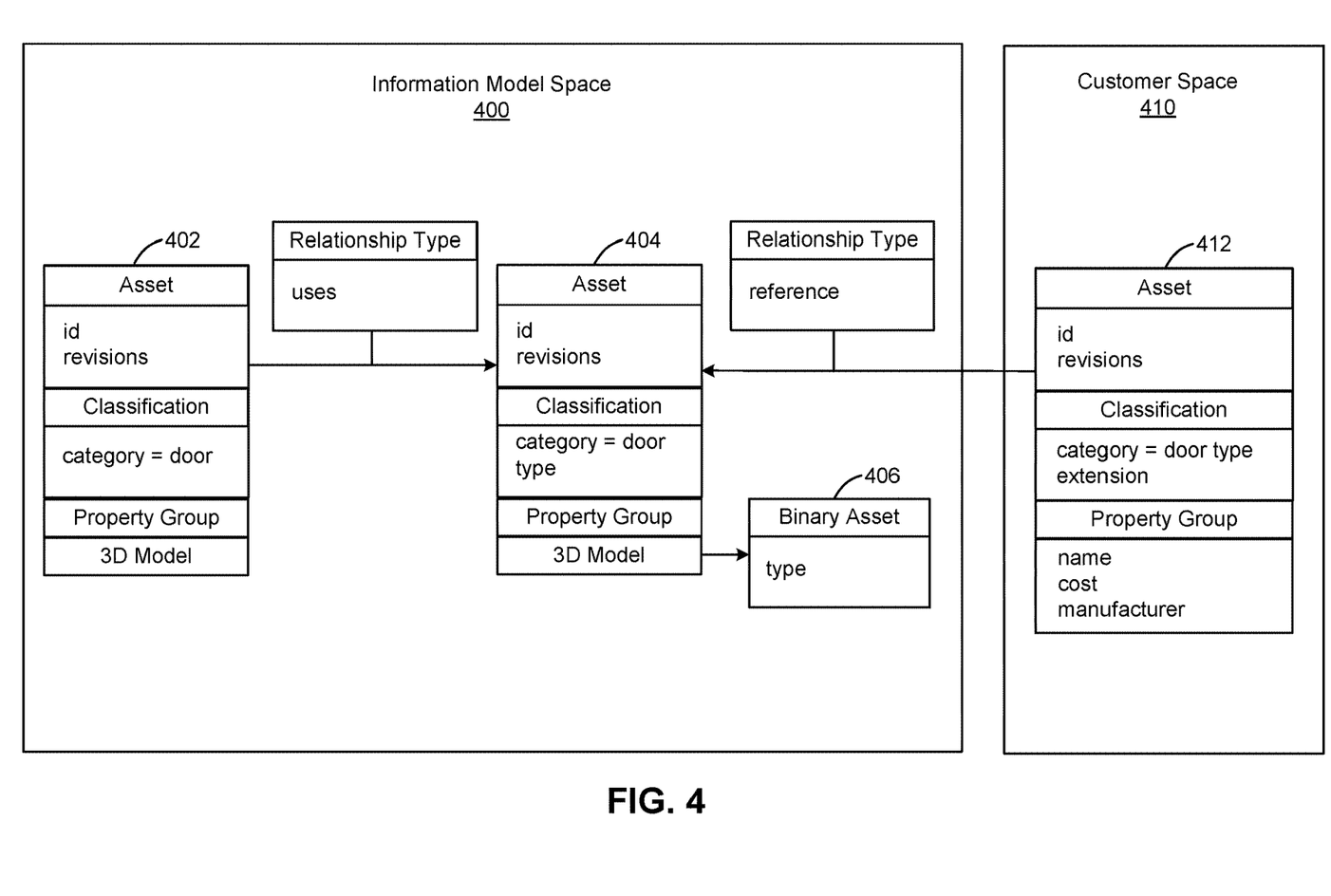
FIG. 4 illustrates exemplar assets that represent a door, according to various embodiments.

FIG. 4 illustrates exemplar assets that are used to represent a door, according to various embodiments. As shown, an asset 402 that represents a door includes an identifier (ID) that uniquely identifies the asset 402 and information indicating revisions of the asset 402. The asset 402 is associated with a classification component that indicates the asset 402 belongs to the category "door," and a property group component that indicates the asset 402 is a 3D model. In some embodiments, an asset is related to each component according to a "containment" relationship that represents a hierarchical containment ownership link from a primary object (e.g., an asset) to a secondary object (e.g., a component). In such cases, the secondary object to primary object relationship can be unique, and each secondary object can only have a single primary object. In addition, the lifetime of the secondary object can be tied to the lifetime of the primary object, such that the secondary object is deleted when the primary object is deleted.

The asset 402 representing the door is related to another asset 404 that represents a type of door and is associated with a classification component that indicates the asset 404 belongs to the category "door type," and a property group component that indicates the asset 404 is a 3D model and references a binary asset 406 that stores data for the 3D model. Illustratively, the asset 402 representing the door is related to the asset 404 representing the door type according to a "uses" relationship. The uses relationship represents a dependency link of an asset using another asset to ensure a revision-coherent aggregation of data. For an asset to be provisioned, all "used" assets need to be provisioned as well. For example, any number of assets (e.g., the asset 402) that represent doors of a particular door type can use an asset (e.g., the asset 404) representing the particular door type. In some embodiments, the information model 150 can also store "based on" relationships that each represent a dependency link between a first object and a second object that the first object is based on. A based on relationship is between object revisions and does not imply a lifetime constraint on either object. Based on relationships can be used to trace back, from a specific object revision, the chain of all contributing object revisions. An example of a based on relationship is an asset representing a door being based on an asset representing a particular material. As another example, an asset representing a room can be based on an asset representing furniture in the room.

The asset 404 representing a type of door is also related to an asset 412 that represents a type of extension to a door and is associated with a classification component that indicates the asset 412 belongs to the category "door type extension," and a property group component that indicates a name, a cost, and a manufacturer of the extension to the door. Illustratively, the asset 412 representing the door type extension is related to the asset 404 representing the door type according to a "reference" relationship. As described, in some embodiments, a reference relationship is a lightweight manner to persist a relationship between assets, and a reference relationship is not enforced by the graph database. By contrast, the uses relationship, described above, is a more robust way to relate assets together, and uses relationships are enforced by the graph database.

Also shown are an information model space 400 and a customer space 410. In some embodiments, spaces have containment relationships with assets (similar to how assets have containment relationships with components) and are used to partition the assets when restrictions on data are required. For example, if a particular user requires access restrictions on data, a new space could be created as a container for assets with access restricted to the particular user. In some embodiments, spaces can be partitioned using other structures, such as a collection that has a containment relationship with spaces. In such cases, the spaces, collections, etc. can also be stored in the information model 150 as, e.g., nodes of a graph database that are connected to other nodes.

As described, an application (e.g., an application 112) can make API calls (e.g., via API 142) to query the information model 150. It should be understood that the application knows what data the application cares about, and the application will query the information model 150 for such data. In some embodiments, an application can query the information 150 model based on components stored in the information model 150 and/or information in the components. For example, an application could query the information model 150 to obtain the total number of assets classified as doors in a building, and the query engine 146 in the cloud service 140 would execute such a query and return the result. As yet another example, an application could query the information model 150 to obtain the amount or cost of materials used in assets classified as doors, and the query engine 146 in the cloud service 140 would execute such a query and return the result to the application. Thereafter, the application can use the query result in any suitable manner (e.g., adding the costs of doors to other costs to obtain a total cost for a building). In some embodiments, the query engine 146 can execute queries in any technically feasible manner, including using known techniques, depending on how the information model 150 is implemented (e.g., as a graph database or federation of databases).

Figure 5:
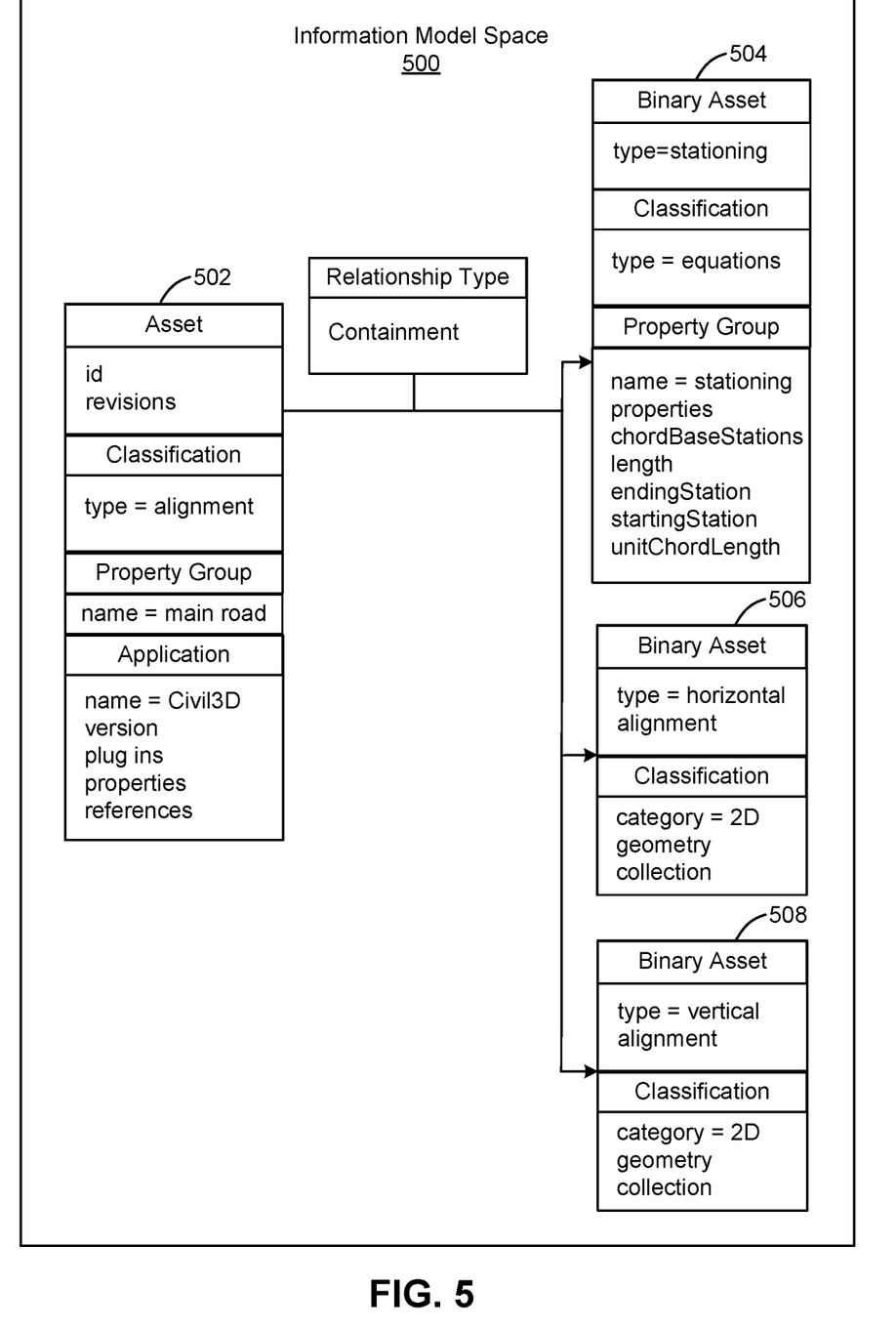
FIG. 5 illustrates exemplar assets that represent an alignment, according to various embodiments.

FIG. 5 illustrates exemplar assets that are used to represent an alignment, according to various embodiments. As shown, an asset 502 that represents an alignment includes an ID that uniquely identifies the asset 502 and information indicating revisions of the asset 502. The asset 502 is associated with a classification component that indicates the asset 502 belongs to the category "alignment"; a property group component that indicates the asset 502 is an alignment for a "main road"; and an application component that indicates a name, a version, plugins, properties, and references associated with an application.

The asset 502 representing the alignment is related to binary assets 504, 506, and 508 representing equations, a collection of 2D geometries for a horizontal alignment, and a collection of 2D geometries for a vertical alignment, respectively. Illustratively, the asset 502 representing the alignment is related to the binary assets 504, 506, and 508 according to a containment relationship.

Also shown is an information model space 500 that has a containment relationship with the asset 502 and the binary assets 504, 506, and 508. The information model space 500 is similar to the information model space 400, described above in conjunction with FIG. 4.

Similar to the description above in conjunction with FIG. 4, an application (e.g., an application 112) can make API calls (e.g., via API 142) to query the information model 150 regarding the asset 502 and the binary assets 504, 506, and 508. For example, an application could query the information model 150 to obtain the total number of assets classified as alignments for main roads, and the query engine 146 in the cloud service 140 would execute such a query and return the result.

Figure 6:
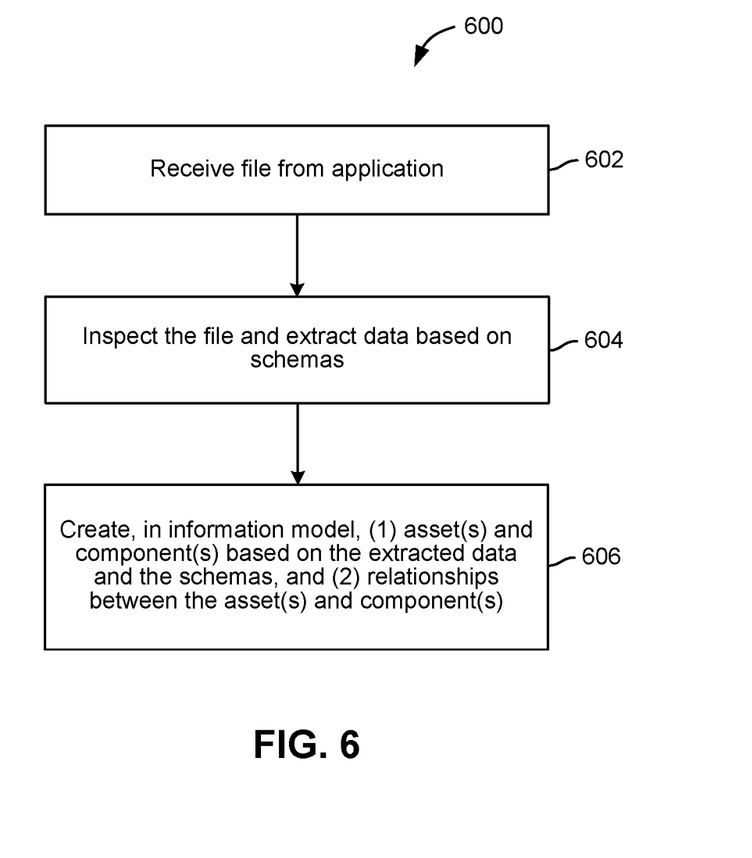
FIG. 6 is a flow diagram of method steps for importing data from a file into an information model, according to various embodiments.

FIG. 6 is a flow diagram of method steps for importing data from a file into an information model, according to various embodiments. Although the method steps are described in conjunction with the system of FIGS. 1-2, persons of ordinary skill in the art will understand that any system configured to perform the method steps, in any order, is within the scope of the present disclosure.

As shown, a method 600 begins at step 702, where the cloud service 150 receives a file from an application, such as one of the applications 112. In some embodiments, the file can have any suitable file format that the importer module 144 understands, and the importer module 144 is able to import multiple different file formats.

At step 604, the importer module 144 inspects the file and extracts data from the file based on schemas. As described, schemas are used to define the organization of data in predefined assets and components in some embodiments. In some embodiments, the importer module 144 opens the file received at step 602, identifies objects that can be represented using assets and components, and extracts data from the file that is needed to create the assets and the components, as defined by the schemas, in the information model 150. As described, the file can include data for assets and components because the application that created the file is aware of the schemas and created the file to include data for assets and components according to the schemas. It should be understood that the file can also include application-specific data that is not used to create assets or components and, in some embodiments, such data may or may not be extracted and imported into the information model 150 for use by the specific application.

At step 606, the cloud service 140 creates, in the information model 150, (1) one or more assets and one or more components based on the extracted data and the schemas, and (2) relationships between the one or more assets and one or more components. In some embodiments, the extracted data is translated into the one or more assets and one or more components, which are then wired together in the information model 150 using the appropriate relationships. The one or more assets and one or more components can be created in any technically feasible manner in some embodiments, depending on how the information model 150 is implemented. For example, if the information model 150 is implemented as a graph database, then the one or more assets and one or more components can be created as nodes in the graph database, and the relationships can be created as links between the nodes. In some other embodiments, data from a file can be transformed in any technically feasible manner (e.g., into blob(s)) and persisted in the information model 150, as described above in conjunction with FIG. 1.

As described, after the one or more assets, the one or more components, and the relationships are created in the information model, the cloud service 140 can also permit an application to read such information via a file, an API call, or in any other technically feasible manner. For example, in some embodiments, when an application reads data from the information model 150, parameters stored in the information model 150 can be used to dynamically generate files where needed for the application.

Figure 7:
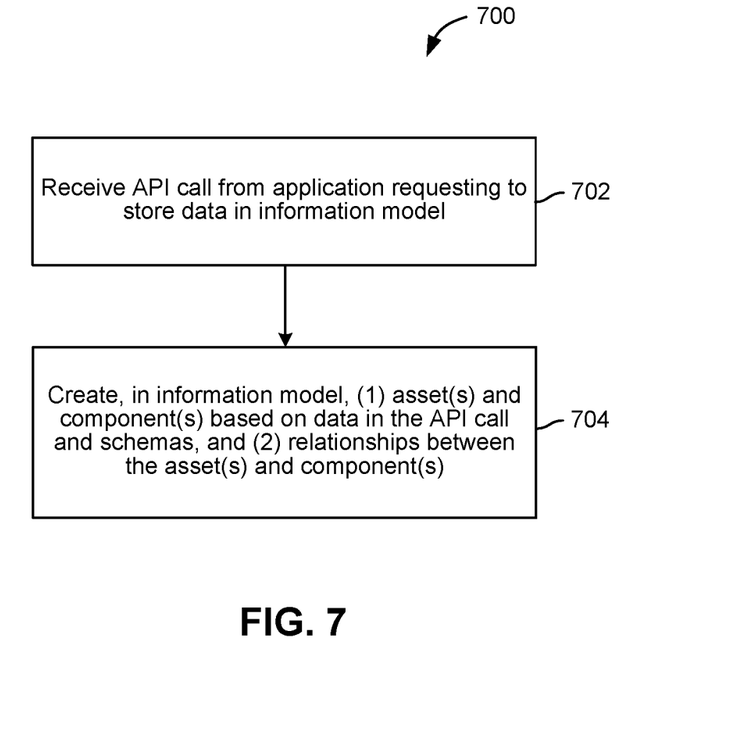
FIG. 7 is a flow diagram of method steps for writing data to an information model via an application programming interface, according to various embodiments.

FIG. 7 is a flow diagram of method steps for writing data to an information model via an application programming interface, according to various embodiments. Although the method steps are described in conjunction with the system of FIGS. 1-2, persons of ordinary skill in the art will understand that any system configured to perform the method steps, in any order, is within the scope of the present disclosure.

As shown, a method 700 begins at step 702, where the cloud service 140 receives an API call from an application requesting to store data in the information model 150. As described, the cloud service 140 exposes the API 142 that can be invoked by applications to write data to the information model 150, among other things.

At step 704, the cloud service 140 creates, in the information model 150, (1) one or more assets and one or more components based on data in the API call and schemas, and (2) relationships between the one or more assets and one or more components. Step 704 is similar to step 606 of the method 600, described above in conjunction with FIG. 6. Similar to the above description, after the one or more assets, the one or more components, and the relationships are created in the information model, the cloud service 140 can also permit an application to read such information via a file, an API call, or in any other technically feasible manner.

Figure 8:
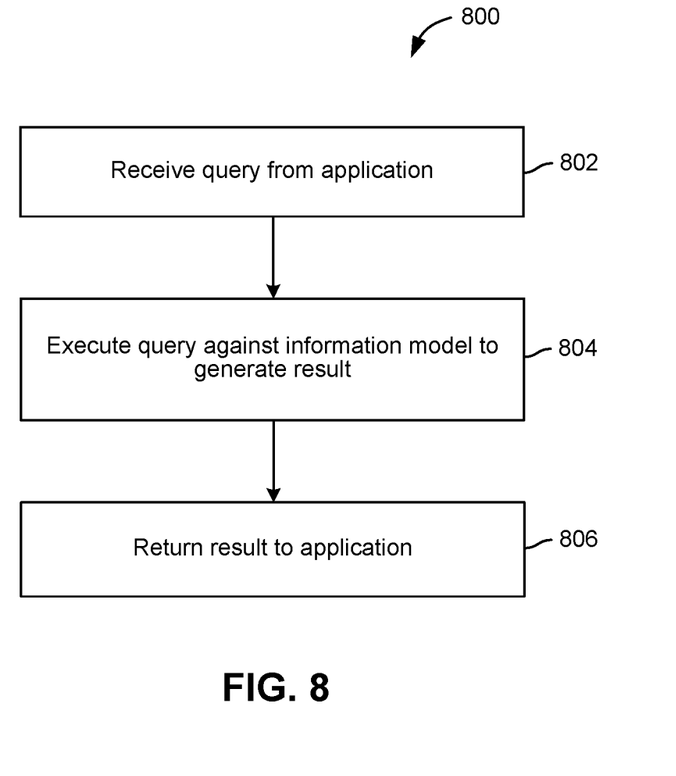
FIG. 8 is a flow diagram of method steps for querying an information model, according to various embodiments.

FIG. 8 is a flow diagram of method steps for querying an information model, according to various embodiments. Although the method steps are described in conjunction with the system of FIGS. 1-2, persons of ordinary skill in the art will understand that any system configured to perform the method steps, in any order, is within the scope of the present disclosure.

As shown, a method 800 begins at step 802, where the cloud service 150 receives a query from an application, such as one of the applications 112. Applications can query the information model 150 in any technically feasible manner in some embodiments. For example, in some embodiments, applications can invoke the API 142 to query the information model 150. In addition, in some embodiments, applications can query the information 150 model based on components stored in the information model 150 and/or information in the components.

At step 804, the query engine 154 executes the query against the information model 150 to generate a result. Depending on what is being queried and how the information model 150 is implemented (e.g., as a graph database or a federation of databases), the query engine 154 can execute the query in any technically feasible manner, including using known techniques, in some embodiments.

At step 806, the query engine 154 returns the result generated at step 804 to the application from which the query was received at step 802.

In sum, techniques are disclosed for storing and accessing data in an information model. In some embodiments, data is stored in the information model using assets, components, and relationships, or using any other suitable transformation of the data. In the case of assets, components, and relationships, each asset is a container for components. Each component stores data according to a schema that defines the organization of data in the component. Assets and components can be related to other assets and/or other components. In some embodiments, assets and components are stored as nodes in a graph database or a federation of databases, and relationships between the assets and components are stored as links between the nodes. A file can be imported into the information model by extracting data from the file, creating assets and components in the information model based on the extracted data, and wiring together the created assets and components. A file can also be used to read from the information model by writing data stored in the information model to the file. In addition or alternatively, an application can invoke an API to write data to the information model. An application can also invoke the API to query the information model, such as to read data from the information model.

One technical advantage of the disclosed techniques relative to the prior art is that, with the disclosed techniques, data is stored in an information model implemented within a computer system, where the information model allows the data to be accessed across different software applications. Further, data stored in the information model can be queried and used more readily than data that is stored in individual files according to prior art techniques. In addition, the information model enables collaboration and managed workflows on the data stored in the information model by surfacing relationships and dependencies within the stored data in a standardized manner. These technical advantages represent one or more technological advancements over prior art approaches.

1. In some embodiments, a computer-implemented method for processing data using an information model comprises receiving a first file that includes data associated with one or more objects, performing one or more operations to extract the data associated with the one or more objects based on one or more schemas, for each object included in the one or more objects, adding to an information model an asset representing the object and one or more components associated with the asset, wherein each component included in the one or more components stores a portion of data associated with the object, executing a query against the information model to generate a result based on at least one of the one or more components, and transmitting the result to an application.

2. The computer-implemented method of clause 1, wherein the information model comprises at least one of a graph database or a federation of databases, and adding to the information model the asset and the one or more components comprises adding, to the at least one of a graph database or a federation of databases, a first node associated with the asset, one or more second nodes associated with the one or more components, and one or more links between the first node and the one or more second nodes.

3. The computer-implemented method of clauses 1 or 2, further comprising adding to the information model at least one relationship between the asset and at least one other asset or component.

4. The computer-implemented method of any of clauses 1-3, wherein the at least one relationship includes a relationship in which the asset owns another asset or component, a relationship in which the asset uses another asset or component, or a relationship in which the asset depends on another asset or component.

5. The computer-implemented method of any of clauses 1-4, wherein the one or more components associated with the asset includes a component that stores data indicating a classification associated with the object represented by the asset.

6. The computer-implemented method of any of clauses 1-5, wherein the one or more components associated with the asset includes a component that stores data indicating an application associated with the asset.

7. The computer-implemented method of any of clauses 1-6, wherein the one or more components associated with the asset includes a component that stores data indicating one or more properties associated with the object represented by the asset.

8. The computer-implemented method of any of clauses 1-7, wherein the one or more components associated with the asset includes a component that stores data indicating one or more variants of the object represented by the asset.

9. The computer-implemented method of any of clauses 1-8, further comprising adding another component to an asset representing an object included in the one or more objects based on a request from an application.

10. The computer-implemented method of any of clauses 1-9, further comprising receiving a second file that includes data associated with one or more additional objects, wherein the second file has a different file format than the first file, performing one or more operations to extract the data associated with the one or more additional objects based on the one or more schemas, and for each object included in the one or more additional objects, adding to the information model an additional asset representing the object and one or more components associated with the additional asset.

11. In some embodiments, one or more non-transitory computer-readable media include instructions that, when executed by at least one processor, cause the at least one processor to perform steps for storing data in an information model, the steps comprising receiving a file that includes data associated with one or more objects, performing one or more operations to extract the data associated with the one or more objects based on one or more schemas, for each object included in the one or more objects, adding to an information model an asset representing the object and one or more components associated with the asset, wherein each component included in the one or more components stores a portion of data associated with the object, executing a query against the information model to generate a result based on at least one of the one or more components, and transmitting the result to an application.

12. The one or more non-transitory computer-readable media of clause 11, wherein the information model comprises at least one of a graph database or a federation of databases, and adding to the information model the asset and the one or more components comprises adding, to the at least one of a graph database or a federation of databases, a first node associated with the asset, one or more second nodes associated with the one or more components, and one or more links between the first node and the one or more second nodes.

13. The one or more non-transitory computer-readable media of clauses 11 or 12, wherein the instructions, when executed by the at least one processor, further cause the at least one processor to perform the step of adding to the information model at least one relationship between the asset and at least one other asset or component.

14. The one or more non-transitory computer-readable media of any of clauses 11-13, wherein the at least one relationship includes a relationship in which the asset owns another asset or component, a relationship in which the asset uses another asset or component, or a relationship in which the asset depends on another asset or component.

15. The one or more non-transitory computer-readable media of any of clauses 11-14, wherein the one or more components associated with the asset includes a component that stores data indicating one or more properties associated with the object represented by the asset.

16. The one or more non-transitory computer-readable media of any of clauses 11-15, wherein data is stored in each component included in the one or more components associated with the asset based on a corresponding schema.

17. The one or more non-transitory computer-readable media of any of clauses 11-16, wherein the instructions, when executed by the at least one processor, further cause the at least one processor to perform the step of adding another component to an asset representing an object included in the one or more objects based on an application programming interface (API) call from the application.

18. In some embodiments, a computer-implemented method for processing data using an information model comprises receiving data associated with one or more objects and one or more relationships between the one or more objects, performing one or more operations to transform the data associated with the one or more objects into transformed data, adding to an information model the transformed data and one or more indications of the one or more relationships between the one or more objects, executing a query against the information model to generate a result based on the transformed data, and transmitting the result to an application.

19. The computer-implemented method of clause 18, wherein the data is transformed into one or more assets representing the one or more objects and one or more components associated with each asset included in the one or more assets.

20. The computer-implemented method of clauses 18 or 19, wherein receiving the data comprises receiving a file or an application programming interface (API) call that includes the data.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for processing data using an information model, the method comprising:
   receiving a first file that includes data associated with one or more objects;
   performing one or more operations to extract the data associated with the one or more objects based on one or more schemas;
   for each object included in the one or more objects, adding to an information model an asset representing the object and one or more components associated with the asset, wherein each component included in the one or more components stores a portion of data associated with the object;
   executing a query against the information model to generate a result based on at least one of the one or more components; and
   transmitting the result to an application.

2. The computer-implemented method of claim 1, wherein the information model comprises at least one of a graph database or a federation of databases, and adding to the information model the asset and the one or more components comprises adding, to the at least one of a graph database or a federation of databases, a first node associated with the asset, one or more second nodes associated with the one or more components, and one or more links between the first node and the one or more second nodes.

3. The computer-implemented method of claim 1, further comprising adding to the information model at least one relationship between the asset and at least one other asset or component.

4. The computer-implemented method of claim 3, wherein the at least one relationship includes a relationship in which the asset owns another asset or component, a relationship in which the asset uses another asset or component, or a relationship in which the asset depends on another asset or component.

5. The computer-implemented method of claim 1, wherein the one or more components associated with the asset includes a component that stores data indicating a classification associated with the object represented by the asset.

6. The computer-implemented method of claim 1, wherein the one or more components associated with the asset includes a component that stores data indicating an application associated with the asset.

7. The computer-implemented method of claim 1, wherein the one or more components associated with the asset includes a component that stores data indicating one or more properties associated with the object represented by the asset.

8. The computer-implemented method of claim 1, wherein the one or more components associated with the asset includes a component that stores data indicating one or more variants of the object represented by the asset.

9. The computer-implemented method of claim 1, further comprising adding another component to an asset representing an object included in the one or more objects based on a request from an application.

10. The computer-implemented method of claim 1, further comprising:
    receiving a second file that includes data associated with one or more additional objects, wherein the second file has a different file format than the first file;

performing one or more operations to extract the data associated with the one or more additional objects based on the one or more schemas; and for each object included in the one or more additional objects, adding to the information model an additional asset representing the object and one or more components associated with the additional asset.

11. One or more non-transitory computer-readable media including instructions that, when executed by at least one processor, cause the at least one processor to perform steps for storing data in an information model, the steps comprising:

receiving a file that includes data associated with one or more objects;

performing one or more operations to extract the data associated with the one or more objects based on one or more schemas;

for each object included in the one or more objects, adding to an information model an asset representing the object and one or more components associated with the asset, wherein each component included in the one or more components stores a portion of data associated with the object;

executing a query against the information model to generate a result based on at least one of the one or more components; and transmitting the result to an application.

12. The one or more non-transitory computer-readable media of claim 11, wherein the information model comprises at least one of a graph database or a federation of databases, and adding to the information model the asset and the one or more components comprises adding, to the at least one of a graph database or a federation of databases, a first node associated with the asset, one or more second nodes associated with the one or more components, and one or more links between the first node and the one or more second nodes.

13. The one or more non-transitory computer-readable media of claim 11, wherein the instructions, when executed by the at least one processor, further cause the at least one processor to perform the step of:

adding to the information model at least one relationship between the asset and at least one other asset or component.

14. The one or more non-transitory computer-readable media of claim 13, wherein the at least one relationship includes a relationship in which the asset owns another asset or component, a relationship in which the asset uses another asset or component, or a relationship in which the asset depends on another asset or component.

15. The one or more non-transitory computer-readable media of claim 11, wherein the one or more components associated with the asset includes a component that stores data indicating one or more properties associated with the object represented by the asset.

16. The one or more non-transitory computer-readable media of claim 11, wherein data is stored in each component included in the one or more components associated with the asset based on a corresponding schema.

17. The one or more non-transitory computer-readable media of claim 11, wherein the instructions, when executed by the at least one processor, further cause the at least one processor to perform the step of:

adding another component to an asset representing an object included in the one or more objects based on an application programming interface (API) call from the application.

18. A computer-implemented method for processing data using an information model, the method comprising:

receiving data associated with one or more objects and one or more relationships between the one or more objects;

performing one or more operations to transform the data associated with the one or more objects into transformed data;

adding to an information model the transformed data and one or more indications of the one or more relationships between the one or more objects;

executing a query against the information model to generate a result based on the transformed data; and transmitting the result to an application.

19. The computer-implemented method of claim 18, wherein the data is transformed into one or more assets representing the one or more objects and one or more components associated with each asset included in the one or more assets.

20. The computer-implemented method of claim 18, wherein receiving the data comprises receiving a file or an application programming interface (API) call that includes the data.

* * * * *